No. 727,507.

Patented May 5, 1903.

UNITED STATES PATENT OFFICE.

FREDERICK JOHN WARREN, OF NEWTON, MASSACHUSETTS.

ASPHALT COMPOSITION AND ITS MANUFACTURE.

SPECIFICATION forming part of Letters Patent No. 727,507, dated May 5, 1903.

Application filed May 16, 1901. Serial No. 60,455. (No specimens.)

*To all whom it may concern:*

Be it known that I, FREDERICK JOHN WARREN, a citizen of the United States, residing at Newton, in the county of Middlesex and State of Massachusetts, have invented a new and useful Improvement in Asphalt Compositions and Their Manufacture, of which the following is a full, clear, and exact description.

The invention relates to an improvement in asphalt compositions—such as pitches, cements, &c.—for use in roofing, paving, waterproofing, insulating, or any other purpose for which asphalt or its products may be used.

The invention is based on the discovery that an asphalt that consists of nearly pure bitumen is more subject to changes of temperature than one which is relatively an impure bitumen—that is, it will flow easier when warm and become more brittle when cold than an asphalt pitch or cement which is not so pure. This property of not being so easily affected by extremes of temperature is especially desirable for use in roofing, paving, and other purposes where the composition is to be subjected to the action of the elements.

The impurities existing in Trinidad Lake asphalt furnishes one of the reasons why it has given uniformly good work, and while the nature of the impurity, which is an infusorial earth, has great advantages I have discovered that lampblack having about the same specific gravity as bitumen and being minutely filled with pores which absorb and take up the bitumens furnishes a substance in an asphalt cement which more greatly increases its range of flexibilty than does any other known substance. It also has the advantage of mixing thoroughly with the asphalt cement or composition in such a manner that it will not settle in the tanks, as do the finest substances heretofore used, and it is therefore possible to maintain an exact equality of bituminous and non-bituminous matter.

I have discovered that the presence of the lampblack in coal-tars and pitches instead of being a detriment, as has been generally considered, is actually necessary to give the pitch, tar, or composition some of those qualities which are invaluable and which are not contained in the asphalts, and I have discovered that a proper amount of lampblack mixed with an asphalt increases their usefulness to such an extent as to make them available for the uses for which they would otherwise be unfit. For the manufacture of roofing-felt in particular it furnishes a very fine grain, which helps to fill the body of the felt and furnishes a toughness and durability not otherwise possible. In concrete pavements it furnishes the finest possible non-bituminous grain, which will aid in the filling of the voids in the mass, and thus add greatly to the life of the mastic or composition. For roofing-cements it tends to retard the flow in hot weather and decreases the liability of cracking or becoming brittle in cold weather.

The varying uses to which asphalt cements or composition are put will determine the percentage of the lampblack to be used. I have contemplated the adding of the lampblack to asphalts either during manufacture or to the crude product or to the refined, to the crude asphalt itself or to the refined asphalt when being reheated or to the asphalt cements or mixtures during their use. The lampblack may also be formed by the product itself by subjecting part of its hydrocarbons to combustion. It may be mixed by agitation by the introduction of carbonized oil or by forcing the lampblack-laden air into a mass of asphalt, the lampblack mixing with the asphalt during its passage through it.

Having thus fully described my invention, I claim and desire to secure by Letters Patent of the United States—

1. An asphalt mixture containing asphalt in combination with lampblack.

2. An asphaltic mixture composed of relatively pure asphalt in combination with lampblack in an amount according to the intended uses.

3. A fluid or semifluid mixture of asphalt and lampblack, substantially as described.

4. The process of rendering relatively pure asphalt efficient as a binder for paving purposes, or as a pitch or saturating fluid for roofing and similar purposes, consisting in treating it with such impurities as lampblack.

5. The process of rendering a relatively pure asphalt more efficient for paving, roofing and other purposes consisting in treating it with lampblack.

FREDERICK JOHN WARREN.

Witnesses:
 F. F. RAYMOND, 2d,
 SAUL SIPPERSTEIN.